United States Patent [19]
Busch

[11] Patent Number: 6,076,894
[45] Date of Patent: Jun. 20, 2000

[54] SEAT BELT SYSTEM

[75] Inventor: Craig A. Busch, Armada, Mich.

[73] Assignee: TRW Vehicle Safety Systems Inc., Lyndhurst, Ohio

[21] Appl. No.: 09/259,094

[22] Filed: Feb. 26, 1999

[51] Int. Cl.⁷ .................................................. B60R 21/00
[52] U.S. Cl. .......................................... 297/484; 297/475
[58] Field of Search ..................... 280/806, 807, 280/808; 297/464, 484, 483, 475, 474, 473

[56] References Cited

U.S. PATENT DOCUMENTS

| | | |
|---|---|---|
| 1,898,090 | 2/1933 | Lethern . |
| 2,195,334 | 3/1940 | Lethern . |
| 2,275,450 | 3/1942 | Manson . |
| 3,165,357 | 1/1965 | Ruedemann, Jr. . |
| 3,306,662 | 2/1967 | Finnigan . |
| 3,325,212 | 6/1967 | Dillender . |
| 3,639,000 | 2/1972 | Keltner . |
| 3,834,758 | 9/1974 | Soule . |
| 4,302,049 | 11/1981 | Simpson . |
| 4,342,483 | 8/1982 | Takada . |
| 4,606,552 | 8/1986 | Hultqvist . |
| 4,854,608 | 8/1989 | Barral . |
| 4,919,488 | 4/1990 | Deegener et al. . |

FOREIGN PATENT DOCUMENTS

| | | | |
|---|---|---|---|
| 214350 | 1/1957 | Australia | 297/484 |
| 3636203 | 5/1988 | Germany | 297/484 |

*Primary Examiner*—Milton Nelson, Jr.
*Attorney, Agent, or Firm*—Tarolli, Sundheim, Covell, Tummino & Szabo L.L.P.

[57] ABSTRACT

A seat belt system (10) comprises first and second shoulder belt portions (30, 32) extensible from an upper portion (20) of the vehicle seat adjacent the shoulders of an occupant. The first and second shoulder belt portions (30, 32) are connected with the vehicle. First and second lap belt portions (74, 85) are extensible from sides (22, 24) of the vehicle seat (14) adjacent sides of the occupant (12) and partially across the lap of the occupant. A first anchor (64) connects a first end portion (62) of the first lap belt portion (74) with the vehicle adjacent one side of the occupant (12). A second anchor (68) connects a first end portion (66) of the second lap belt portion (85) with the vehicle adjacent another side of the occupant (12). The first and second shoulder belt portions (30, 32) and the first and second lap belt portions (74, 85) are interconnected adjacent a waist of the occupant (12). The first lap belt portion (74) has a second end portion (98) wound on a spool (96) of a retractor (76).

25 Claims, 3 Drawing Sheets

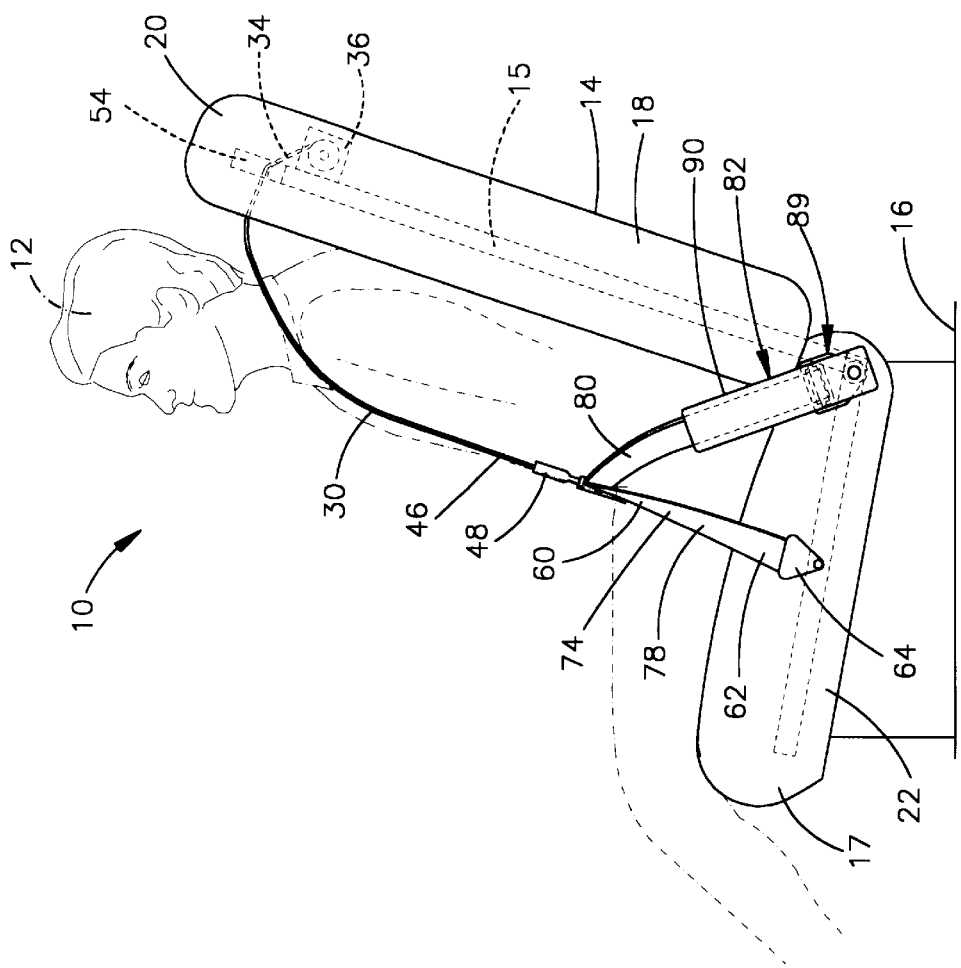
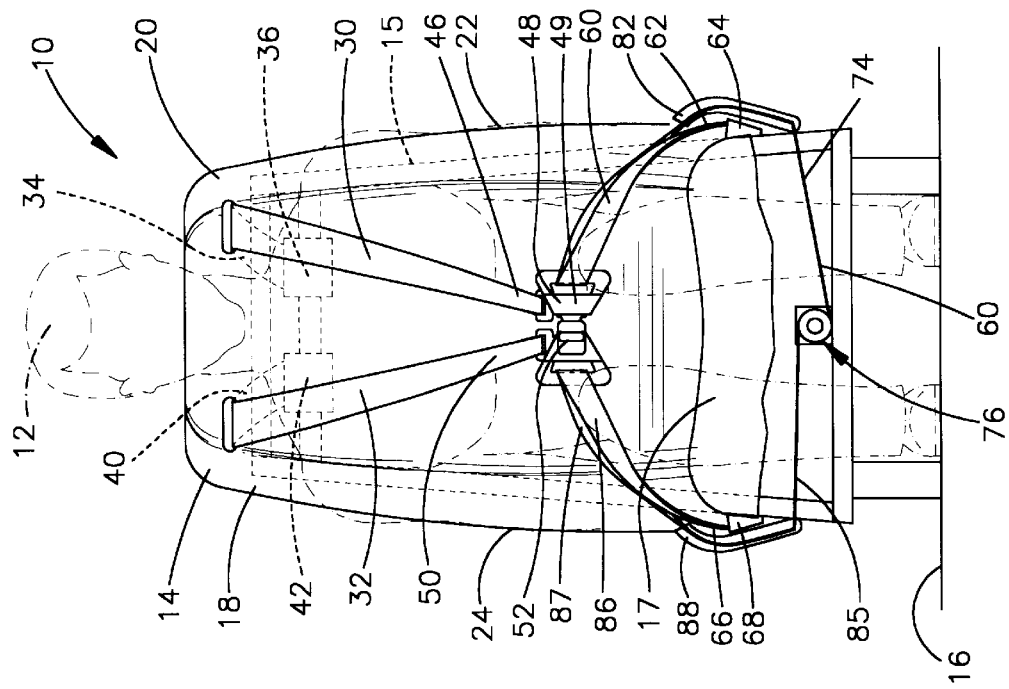

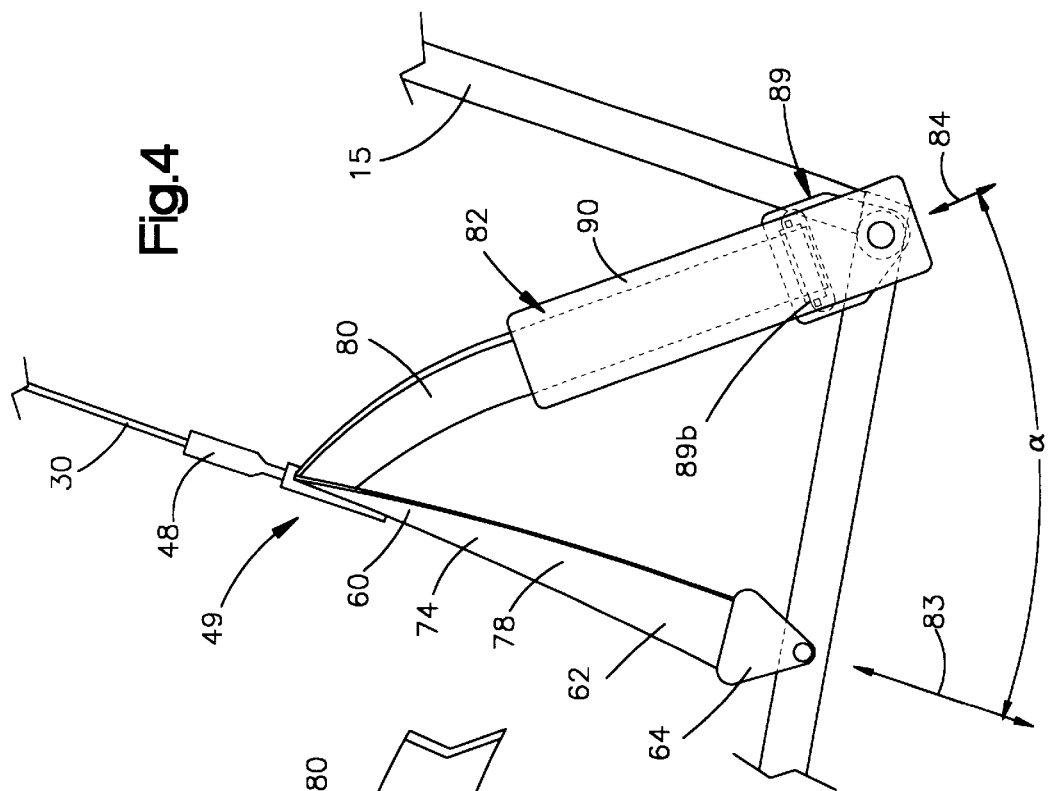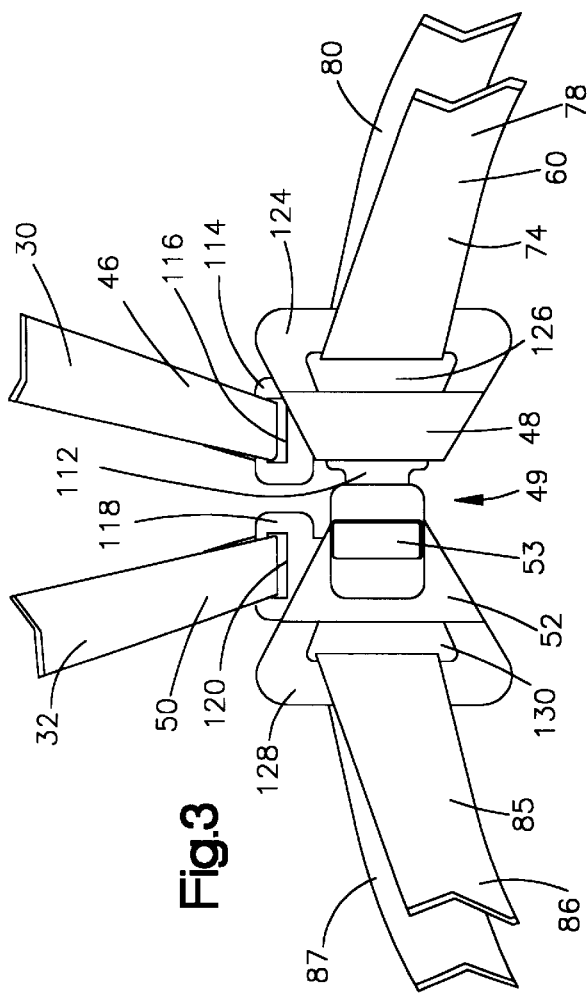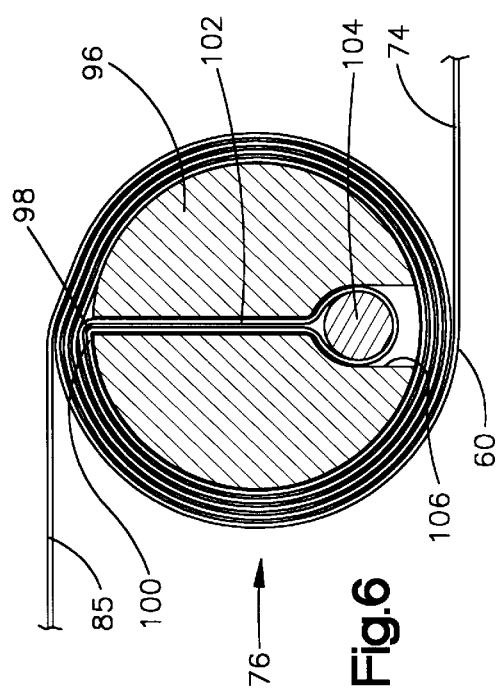

SEAT BELT SYSTEM

FIELD OF THE INVENTION

The present invention relates to a seat belt system for restraining a vehicle occupant in a vehicle seat.

BACKGROUND OF THE INVENTION

A known seat belt system includes two shoulder belts extending from an upper portion of a vehicle seat. Each of the shoulder belts has one end connected with the vehicle. Each of the shoulder belts has another end connected with a buckle assembly.

A lap belt extends from each side of the vehicle seat and partially across the lap of the occupant. Each of the lap belts has one end anchored to the vehicle adjacent a side of the vehicle seat. Each of the lap belts has another end connected with the buckle assembly. The buckle assembly interconnects the shoulder belts and the lap belts with the shoulder belts and lap belts extending about the occupant of the seat.

SUMMARY OF THE INVENTION

In accordance with the present invention, a seat belt system for a vehicle occupant seated in a vehicle seat includes first and second shoulder belt portions extensible from an upper portion of the vehicle seat adjacent the shoulders of the occupant. The first and second shoulder belt portions are connected with the vehicle. First and second lap belt portions are extensible from sides of the vehicle seat adjacent sides of the occupant and partially across the lap of the occupant.

A first anchor connects a first end portion of the first lap belt portion with the vehicle adjacent one side of the occupant. A second anchor connects a first end portion of the second lap belt portion with the vehicle adjacent another side of the occupant. The first and second shoulder belt portions and the first and second lap belt portions are interconnected adjacent a waist of the occupant by a buckle assembly. The first lap belt portion has a second end portion wound around a spool of a seat belt retractor.

Also, in accordance with the present invention, the first lap belt portion has a first length extending from the first anchor to the buckle assembly in a first direction. The first lap belt portion has a second length extending from the buckle assembly in a second direction. The first and second directions extend at an acute angle to each other.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 1 is a schematic view of a vehicle seat including a seat belt system of the present invention;

FIG. 2 is a schematic side view of the vehicle seat of FIG. 1;

FIG. 3 is an enlarged schematic view of a buckle assembly of the seat belt system of FIG. 1;

FIG. 4 is an enlarged side view of a portion of the seat belt system of FIG. 1;

FIG. 6 is an enlarged schematic view of a spool of a retractor in the seat belt system of FIG. 1.

DESCRIPTION OF THE PREFERRED EMBODIMENT

Figure 5:
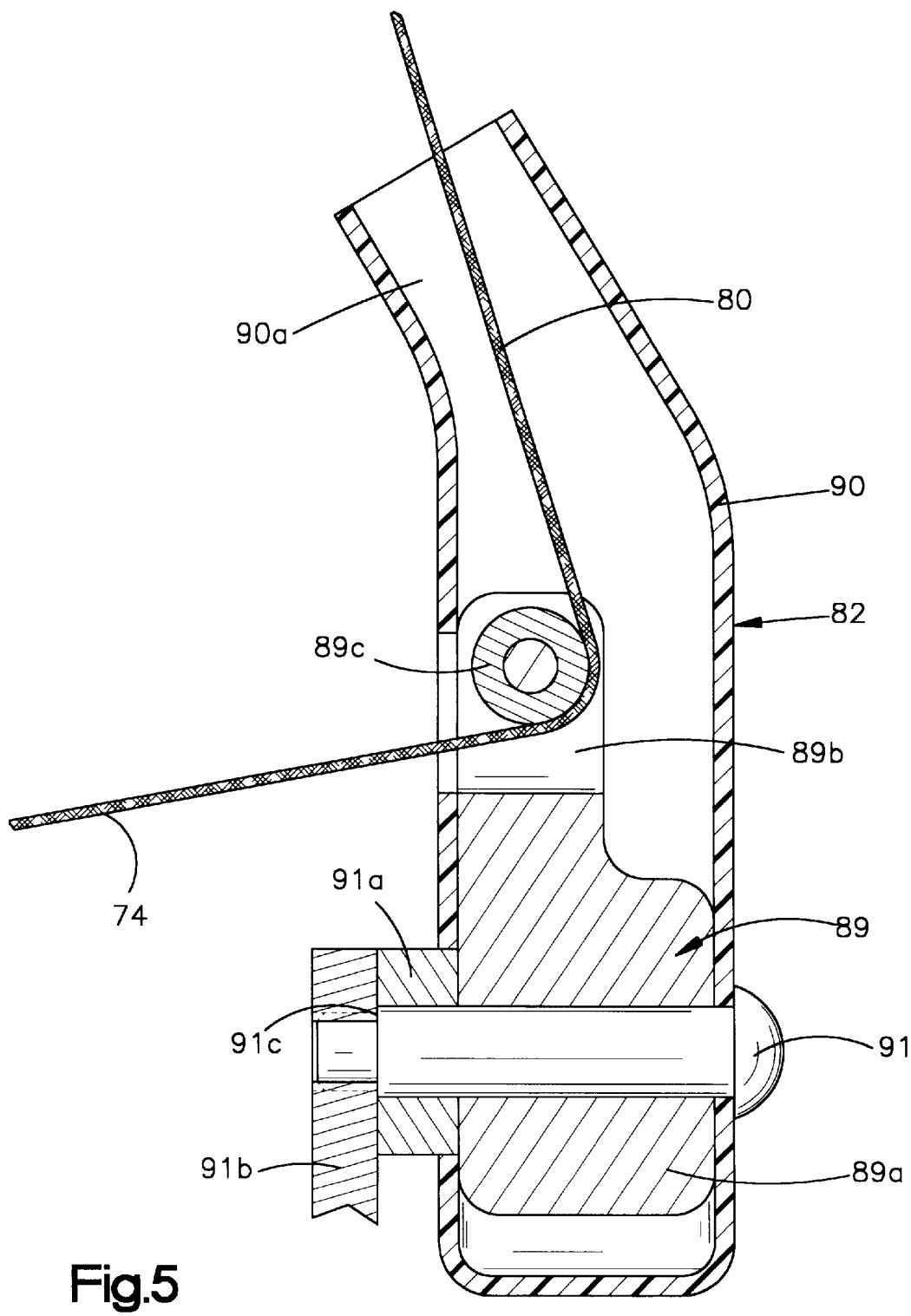
FIG. 5 is an enlarged sectional view of a portion of the seat belt system of FIG. 1.

A seat belt system 10 for restraining a vehicle occupant 12 seated in a vehicle seat 14 is shown in FIGS. 1 and 2. The seat 14 has a frame 15 connected with a floor 16 of a vehicle, as is well known in the art. The seat 14 has a seat portion 17 on which the occupant 12 sits. A backrest 18 extends from the seat portion 17. The backrest 18 has an upper portion 20 located adjacent the shoulders of the occupant 12. The seat 14 has sides 22 and 24 located adjacent sides of the occupant 12.

Shoulder belts 30 and 32 (FIG. 1) extend from the upper portion 20 of the backrest 18 adjacent the shoulders of the occupant 12. The shoulder belt 30 (FIGS. 1 and 2) has an end 34 connected with a shoulder belt retractor 36. The shoulder belt 32 has an end 40 connected with a shoulder belt retractor 42. The retractors 36 and 42 are mounted on the frame 15 of the backrest 18 adjacent the shoulders of the occupant 12.

The shoulder belt retractors 36 and 42 include springs (not shown) for biasing the retractors to wind the shoulder belts 30 and 32 onto the retractors. The retractors 36 and 42 include locking mechanisms (not shown) to prevent unwinding of the shoulder belts 30 and 32 in the event of the vehicle encountering deceleration above a predetermined value, as is well known in the art. The retractors 36 and 42 preferably lock in response to a sensor sensing deceleration of the vehicle above the predetermined value and/or in response to unwinding acceleration of the shoulder belts 30 and 32, respectively, above a predetermined value.

The shoulder belt 30 (FIGS. 1 and 3) has another end 46 connected with a buckle member 48 of a buckle assembly 49. The shoulder belt 32 has another end 50 connected with a buckle member 52 of the buckle assembly 49. A guide 54 (FIG. 2) guides the shoulder belt 30 from the retractor 36 to the buckle member 48. Another guide (not shown) guides the shoulder belt 32 from the retractor 42 to the buckle member 52. The guides are fixedly connected to the frame 15 of the backrest 18.

The buckle member 48 (FIG. 3) has a tongue 112 which is engageable with a locking member (not shown) of the buckle member 52 to interconnect the buckle members 48 and 52, as is well known in the art. Also, the buckle member 52 has a pushbutton 53 which when pushed disconnects the buckle members 48 and 52.

The buckle member 48 has a frame 114 with a slot 116. The end 46 of the shoulder belt 30 extends through the slot 116 and is sewn upon itself in a loop to connect the shoulder belt 30 with the buckle member 48. The buckle member 52 has a frame 118 with a slot 120. The end portion 50 of the shoulder belt 32 extends through the slot 120 and is sewn upon itself in a loop to connect the shoulder belt 32 with the buckle member 52. Alternatively, the shoulder belts 30, 32 could be connected to respective lockable members, such as tongues, which are releasably latched to the buckle members 48, 52, respectively.

A lap belt 60 (FIGS. 1 and 2) has an end 62 connected to the frame 15 of the seat 14 adjacent the side 22 of the seat 14 by an anchor 64. The anchor 64 is suitably attached to the end 62 of the lap belt 60 and is preferably pivotally attached to the frame 15. Another end 66 (FIG. 1) of the lap belt 60 is connected to the frame 15 adjacent the side 24 of the seat 14 by an anchor 68. The anchor 68 is suitably attached to the end 66 of the lap belt 60 and is preferably pivotally attached to the frame 15. The anchors 64 and 68 are connected to the frame 15 in any manner well known in the art, such as by bolting the anchors to the frame.

A lap belt portion 74 of the lap belt 60 extends from the anchor 64 to a seat belt retractor 76 connected to the frame 15 below the seat portion 17. When the buckle members 48 and 52 are interconnected, a length 78 (FIG. 4) of the lap belt portion 74 extends from the anchor 64 to the buckle member 48. A length 80 of the lap belt portion 74 extends from the buckle member 48 through a guide 82 for guiding the lap belt portion 74 to the retractor 76. The length 78 extends in a first direction, indicated by the double arrow 83 in FIG. 4, and the length 80 extends in a second direction, indicated by the double arrow 84 in FIG. 4. The directions 83 and 84 extend at an acute angle α (FIG. 4) to each other. Preferably, the first and second directions 83 and 84 extend at an acute angle of approximately 42° relative to each other.

Also, when the buckle members are interconnected, a lap belt portion 85 (FIGS. 1 and 3) of the lap belt 60 extends from the anchor 68 to the retractor 76. A length 86 of the lap belt portion 85 extends from the anchor 68 to the buckle member 52. A length 87 of the lap belt portion 85 extends from the buckle member 52 through a guide 88, similar to guide 82, for guiding the lap belt portion 85 to the retractor 76. The length 86 extends in a first direction at an acute angle to a second direction in which the length 87 extends. Preferably, the lengths 86 and 87 extend at an angle of approximately 42° relative to each other in the same manner as shown in FIG. 4 for the lengths 78, 80.

The guide 82 includes a D-ring portion 89 and a hollow cover portion 90 which encloses the D-ring portion 89. The D-ring portion includes a base 89a (FIG. 5) having a pair of spaced apart arms 89b. A roller 89c is supported by the arms 89b for rotation relative to the arms 89b and base 89a about the axis of the roller 89c.

The hollow cover portion 90 encloses the D-ring portion 89. The cover portion 90 extends away from the D-ring portion 89 toward the buckle member 48. The cover portion 90 is contoured to curve around a part of the occupant as it extends toward the buckle member 48.

The guide 82 is pivotally attached to the frame 15 of the seat 14 adjacent the side 22 by a bolt 91. The bolt 91 extends through an opening in the cover portion 90 and an opening in the base 89a of the D-ring portion 89. The bolt 91 also extends through a spacer 91a and screws into a threaded opening in a fixed part 91b of the frame 15. The bolt 91 is a shoulder bolt and has a shoulder 91c which engages the part 91b. The D-ring portion 89 and cover portion 90 are rotatable about the axis of the bolt 91.

The length 80 of the lap belt portion 74 extends through the cover 90 and around the D-ring roller 89c. The cover has a chamber 90a in which the D-ring roller 89c is located. The length 80 of the lap belt portion 74 extends from buckle member 48 into the chamber 90a. The length 80 of lap belt portion 74 extends through the chamber 90a and extends around and is guided by the roller 89c. The belt portion 74 exits from the chamber 90a through an opening in the cover 90. The belt portion 74 extends from the cover 90 to the retractor 76.

The guide 88 is similar to the guide 82 and will not be described in detail. The guide 88 (FIG. 1) is pivotally connected with the frame 15 of the seat 14 adjacent the side 24. The guide 88 includes a D-ring portion similar to D-ring portion 89 of guide 82. A hollow cover, similar to the cover 90, is connected with the D-ring portion and extends toward the buckle member 52. The cover is contoured to curve around the occupant 12. The length 87 of the lap belt portion 85 extends through the cover.

The retractor 76 has a spool 96 (FIG. 6) around which an end portion 98 of the lap belt portion 74 of the lap belt 60 and an end portion 100 of the lap belt portion 85 of the lap belt 60 are wound. The end portions 98 and 100 of the lap belt portions 74 and 85 are wound on the spool 96 in an overlapping manner.

The lap belt portion 74 extends from a lower side of the spool 96, as viewed in FIGS. 1 and 6, toward the guide 82 and the lap belt portion 85 extends from an upper side of the spool toward the guide 88. The end portions 98 and 100 (FIG. 6) of the lap belt portions 74 and 85 are retained in a slot 102 in the spool 96 by a pin 104 located in a recess 106 in the spool. The lap belt 60 is thus connected to the spool because the end portions 98 and 100 are actually adjoining portions of a single, continuous length of seat belt webbing and the lap belt 60 is effectively looped around the pin 104.

The retractor 76 has a spring (not shown) for biasing the retractor to wind the lap belt portions 74 and 85 onto the retractor, as is well known in the art. The spring of the retractor 76 is stronger than the combined springs of retractors 36 and 42. The retractor 76 includes a locking mechanism (not shown) to prevent unwinding of the lap belt portions 74 and 85 in the event of the vehicle encountering deceleration above a predetermined value, as is well known in the art. The retractor 76 preferably locks in response to a sensor sensing deceleration of the vehicle above a predetermined value and/or in response to unwinding acceleration of the lap belt portions 74 and 85 above a predetermined value.

The buckle member 48 includes a guide 124 with a slot 126. The lap belt portion 74 extends from the anchor 64 through the slot 126 in the guide 124 and to the guide 82. The lap belt portion 74 is slidable relative to buckle member 48 through the slot 126. The buckle member 52 has a guide 128 with a slot 130. The lap belt portion 85 extends from the anchor 68 through the slot 130 in the guide 128 and to the guide 88. The lap belt portion 85 is slidable relative to buckle member 52 through the slot 130.

When the buckle members 48 and 52 are disconnected, the retractors 36, 42, and 76 retract the shoulder belts 30 and 32 and the lap belt portions 74 and 85. The retractor 76 applies equal forces to the lap belt portions 74, 85. The lap belt portion 74 slides in the guides 124 and 82 and is wound on the retractor spool 96. Likewise, the lap belt portion 85 slides in the guides 128 and 88 and is wound on the retractor spool 96. The buckle members 48, 52 are pulled by the belt portions 74, 85 in opposite directions toward the respective sides 22, 24 of the seat 14. The buckle members 48 and 52 are pulled into contact with the guides 82, 88, respectively.

When the occupant 12 interconnects the buckle members 48 and 52, the shoulder belt portions 30 and 32 and the lap belt portions 74 and 85 are withdrawn from the retractors 36, 42, and 76. If the occupant 12 moves the buckle member 48 past a center position relative to the occupant, shown in FIG. 1, toward the side 24, an excess of the lap belt portion 85 will be unwound from spool 96. This excess will collect beneath the vehicle seat 14. Likewise, if the occupant 12 moves buckle member 52 past a center position relative to the occupant toward side 22, an excess of the lap belt portion 74 will be unwound from spool 96. This excess also will collect beneath the vehicle seat 14. When the buckle members 48 and 52 are interconnected, by the occupant 12, the retractor 76 biases the lap belt portions 74 and 85, including any excess collected beneath the vehicle seat 14, to wind onto the spool 96 and centers the buckle assembly 49 relative to the occupant 12. The retractor 76 acting on the lap belt portions 74, 85 pulls the buckle members 48, 52 rearwardly and downwardly relative to the vehicle occupant 12 to locate the buckle members adjacent the waist of the occupant. The biasing spring in the retractor 76 is strong enough to overcome the combined force of the springs in the retractors 36, 42, friction in the system, and the weight of the belt portions and buckle members 48, 52 to move the buckle members rearwardly and downwardly relative to the vehicle occupant.

From the above description of the invention, those skilled in the art will perceive improvements, changes and modifications. Such improvements, changes and modifications within the skill of the art are intended to be covered by the appended claims. For example, the buckle members 48 and 52 comprise a means for interconnecting the shoulder belts 30, 32 and lap belt portions 74, 85, and as an alternative structure the shoulder belts 30, 32 and lap belt portions 74, 85 could be interconnected by any suitable mechanism, such as a clasp mechanism. Also, while the drawings illustrate the seat belt system 10 mounted on a vehicle seat and thus integrated with the seat, the seat belt system could not be integrated with the seat but mounted to the vehicle body. Furthermore, the system could include pretensioners (not shown) and energy management devices (not shown).

Having described the invention, the following is claimed:

1. A seat belt system for a vehicle occupant seated in a vehicle seat, said seat belt system comprising:

first and second shoulder belt portions adapted to be connected with the vehicle and adapted to be extended from an upper portion of the vehicle seat adjacent the shoulders of the occupant;

first and second lap belt portions, a first end portion of the first lap belt portion adapted to be connected at a first location with the vehicle adjacent a first side of the vehicle seat, a first end portion of the second lap belt portion adapted to be connected at a second location with the vehicle adjacent a second side of the vehicle seat, each of the first and second lap belt portions being extensible from one of the first and second sides of the vehicle seat and partially across the lap of the occupant;

means for interconnecting said first and second shoulder belt portions and said first and second lap belt portions adjacent a waist of the occupant; and a retractor having a spool, a second end portion of the first lap belt portion being wound on said spool.

2. A seat belt system as defined in claim 1 further including first and second retractors associated with said first and second shoulder belt portions for connecting said first and second shoulder belt portions with the vehicle.

3. A seat belt system as defined in claim 2 wherein said first and second shoulder belt portions have first ends connected to said interconnecting means and second ends connected to said first and second retractors.

4. A seat belt system as defined in claim 1 wherein said second lap belt portion has a second end connected with said retractor.

5. A seat belt system as defined in claim 4 wherein said interconnecting means includes first and second buckle members engageable with each other, said first shoulder belt portion being connected to said first buckle member, said second shoulder belt portion being connected to said second buckle member, said first buckle member including means for guiding said first lap belt portion from said retractor to said first location, said second buckle member including means for guiding said second lap belt portion from said retractor to said second location.

6. A seat belt system as defined in claim 4 wherein said second end of said second lap belt portion is wound on said spool of said retractor.

7. A seat belt system as defined in claim 6 wherein said second ends of said first and second lap belt portions are connected to each other.

8. A seat belt system as defined in claim 1 further including a guide for guiding said first lap belt portion from said retractor to said interconnecting means.

9. A seat belt system as defined in claim 8 wherein said guide includes a first guide adapted to be connected with the vehicle adjacent the one side of occupant, said interconnecting means including a second guide for guiding said first lap belt portion from said first guide to said first location where said first lap belt portion is connectable the vehicle.

10. A seat belt system as defined in claim 9 wherein said first guide is adapted to pivot relative to the vehicle seat.

11. A seat belt system as defined in claim 9 wherein said retractor is adapted to be connected to a bottom of the vehicle seat.

12. A seat belt system as defined in claim 9 wherein said first guide includes a cover member for covering a length of said first lap belt portion, said length adapted to extend from adjacent the one side of the occupant and toward said interconnecting means.

13. A seat belt system as defined in claim 9 wherein said first lap belt portion has a first length adapted to be extended from said first location to said interconnecting means in a first direction and said first lap belt portion has a second length extending from said interconnecting means to the one side of the occupant in a second direction.

14. A seat belt system as defined in claim 13 wherein said first and second directions extend at an acute angle to each other.

15. A seat belt system as defined in claim 14 wherein said first and second directions extend at an angle of approximately 42° to each other.

16. A seat belt system for a vehicle occupant seated in a vehicle seat, said seat belt system comprising:

a first shoulder belt portion having a first end adapted to be anchored adjacent one of the occupant's shoulders and a second end;

a second shoulder belt portion having a third end adapted to be anchored adjacent the other of the occupant's shoulders and a fourth end;

a first lap belt portion having a fifth end adapted to be anchored at a first location adjacent one side of the occupant and a sixth end, said first lap belt portion adapted to be extended from said fifth end partially across the lap of the occupant;

a second lap belt portion having a seventh end adapted to be anchored at a second location adjacent another side of the occupant and an eighth end, said second lap belt portion adapted to be extended from said seventh end partially across the lap of the occupant;

a seat belt retractor to which said sixth and eighth ends are directly connected; and means for connecting said second end, said fourth end, and said first and second lap belt portions together adjacent the occupant's waist.

17. A seat belt system as defined in claim 16 wherein said retractor is adapted to be connected to a bottom of the vehicle seat.

18. A seat belt system as defined in claim 16 wherein said retractor includes a spool, said sixth and eighth ends being wound on said spool.

19. A seat belt system as defined in claim 16 wherein aid interconnecting means includes first and second buckle members engageable with each other, said second being connected to said first buckle member, said fourth end being connected to said second buckle member, said first buckle member including means for guiding said first lap belt portion from said retractor to said first location, said second buckle member including means for guiding said second lap belt portion from said retractor to said second location.

20. A seat belt system as defined in claim 16 further including a first guide adapted to be anchored adjacent the one side of the occupant, said first lap belt portion extending from said first guide to said connecting means, said interconnecting means including a second guide for guiding said first lap belt portion from said first guide to said first location.

21. A seat belt system as defined in claim 20 wherein said first guide includes a cover member for covering a length of said first lap belt portion, said length adapted to extend from adjacent the one side of the occupant and toward said connecting means.

22. A seat belt system as defined in claim 20 wherein said first lap belt portion has a first length extending from said fifth end to said interconnecting means in a first direction, said first lap belt portion having a second length extending from said interconnecting means to said first guide in a second direction, said first and second directions extending at an acute angle to each other.

23. A seat belt system for a vehicle occupant seated in a vehicle seat, said seat belt system comprising:

first and second shoulder belt portions adapted to be extended from an upper portion of the vehicle seat adjacent shoulders of the occupant;

first and second lap belt portions adapted to be extended from first and second locations, respectively, at sides of the vehicle seat partially across the lap of the occupant in the vehicle seat;

means for interconnecting said first and second shoulder belt portions and said first and second lap belt portions adjacent a waist of the occupant;

said first lap belt portion having a first length adapted to be extented from said first location to said interconnecting means in a first direction, said first lap belt portion having a second length extending from said interconnecting means in a second direction at an acute angle to said first direction, said second length adapted to be extended from said interconnecting means to a third location at the side of the vehicle seat.

24. A seat belt system as defined in claim 23 further including a first guide for guiding said second length of said lap belt portion, said first guide adapted to be connected with the vehicle adjacent one side of the occupant, said interconnecting means including a second guide for guiding said first lap belt portion from said first guide to said first location.

25. A seat belt system as defined in claim 23 wherein said second length is adapted to be attached to the vehicle seat at the third location.

* * * * *

UNITED STATES PATENT AND TRADEMARK OFFICE
CERTIFICATE OF CORRECTION

PATENT NO. : 6,076,894
DATED : June 20, 2000
INVENTOR(S) : Craig A. Busch

It is certified that error appears in the above-indentified patent and that said Letters Patent is hereby corrected as shown below:

Column 7, line 10, delete "inter-"

Column 7, line 21, change "interconnecting" to "connecting"

Column 8, line 11, change "extented" to "extended"

Signed and Sealed this

Twenty-second Day of May, 2001

Attest:

NICHOLAS P. GODICI

*Attesting Officer*   Acting Director of the United States Patent and Trademark Office